Figure 3:
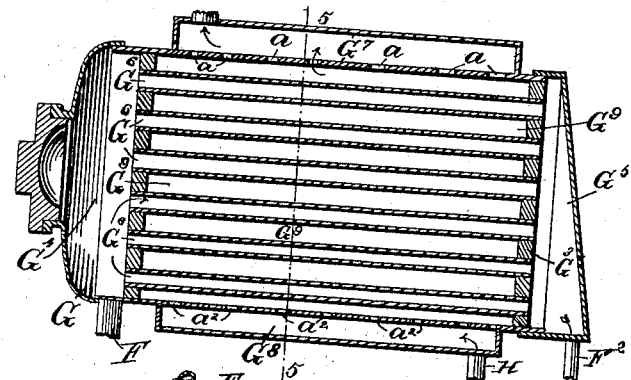

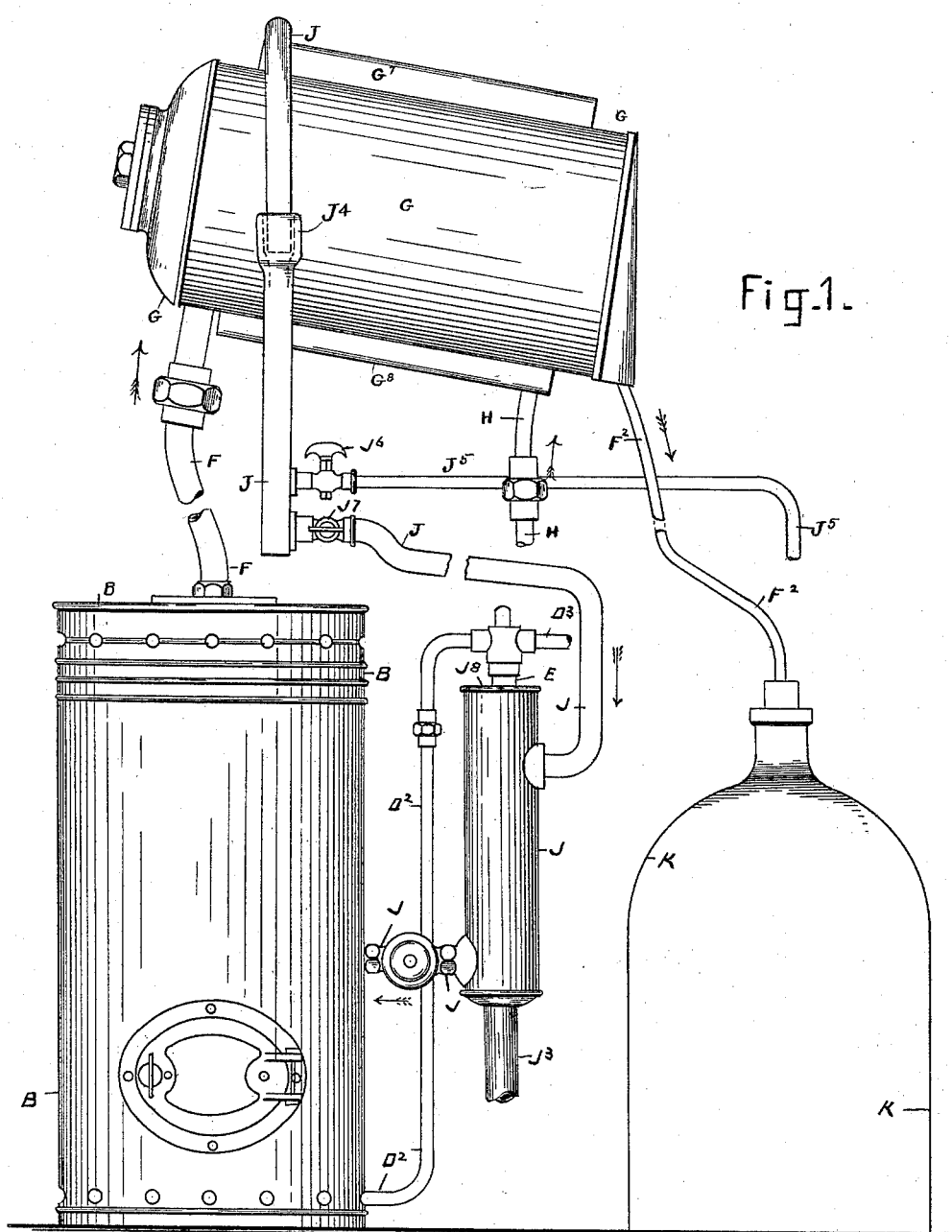

(No Model.) 2 Sheets—Sheet 2.

R. P. BARNSTEAD.
APPARATUS FOR DISTILLING WATER.

No. 456,922. Patented July 28, 1891.

Witnesses.
Frances M. Brown.
Marion E. Brown.

Inventor.
Robert P. Barnstead
by his Atty's.
Brown Bros

UNITED STATES PATENT OFFICE.

ROBERT P. BARNSTEAD, OF BOSTON, MASSACHUSETTS, ASSIGNOR, BY DIRECT AND MESNE ASSIGNMENTS, TO THE BARNSTEAD PURE WATER STILL COMPANY, OF PORTLAND, MAINE.

APPARATUS FOR DISTILLING WATER.

SPECIFICATION forming part of Letters Patent No. 456,922, dated July 28, 1891.

Application filed April 3, 1890. Serial No. 346,494. (No model.)

*To all whom it may concern:*

Be it known that I, ROBERT P. BARNSTEAD, a citizen of the United States of America, and a resident of the city of Boston, in the county of Suffolk and State of Massachusetts, have invented certain new and useful Improvements in Apparatus for Distilling Water, &c., of which the following is a full, clear, and exact description.

This invention relates to an apparatus for carrying out the method for distilling water forming the subject-matter of a separate application, Serial No. 346,495, for Letters Patent of the United States, and to which reference is hereby had for a more particular understanding thereof.

The water-distilling apparatus of this invention in substance is composed, first, of a water-evaporating vessel, means to heat and thereby to evaporate the water contained in said vessel, and a drum which is in communication with and is of suitable construction to condense the vapors entering it from said vessel and to discharge from it the water of condensation, in combination with a water-passage connecting said evaporating-vessel with a water-supply under pressure, and having an opening that leads therefrom and in a direction opposite to the run of the water therethrough and at its farther end portion is open to the external air, and means to heat the water as it passes through said water-passage and to a degree sufficient to set free its ammoniacal and other extraneous and impure gases, all so that prior to the entrance of the water into the evaporating-vessel said gases escape and the water in a heated condition is then entered into said evaporating-vessel to be evaporated, and its vapors entering into are condensed in and the water of condensation discharged from said drum; second, of a water-evaporating vessel and means to heat and thereby to evaporate the water contained in said vessel, in combination with a drum, which interiorly is partitioned off into transverse chambers one at each end and an intermediate one closed to the end chambers, and has a passage (preferably a series) that passes from end to end of and is closed to said intermediate chamber, but is open to the end chambers, and with water-passages, one connecting said evaporating-vessel and one of the end chambers of said drum, another connecting the other end chamber with a suitable water-receiver, and another connecting said intermediate chamber with a water-supply under pressure, and another connecting said intermediate chamber with said evaporating-vessel, all so that the water to be evaporated and before it is entered into the evaporating-vessel is first passed through said intermediate chamber of said drum and thereby utilized to condense the vapors which have arisen from said evaporating-vessel and are in said passage of said chamber, and is thence entered in a more or less heated condition into the evaporating-vessel to be there evaporated and its vapors condensed as before, and so on, the water of condensation discharging from the drum at its end opposite to that connected with said evaporating-vessel; third, of a water-evaporating vessel, and means to heat and thereby to evaporate the water contained in said vessel, and a drum which is in communication with and is of suitable construction to condense the vapors entering it from said vessel, and to discharge from it the water of condensation, in combination with a water-passage connecting said evaporating-vessel with a water-supply under pressure and having intermediate of its length and at the outside and within the height of said evaporating-vessel two separated vertical water-chambers, preferably concentric, both at their upper ends and one only at its lower portion open to said water-passage and the one at its lower end portion open to said water-passage, having its upper open end on a level preferably lower, but in no event higher, than the level of the upper open end of the other, and all so that a predetermined height of water in the evaporating-vessel is maintained, whatever may be the supply of water in excess thereof, and said excess is discharged and without entrance into said evaporating-vessel.

Further than the above the apparatus of this invention contains other features of improvement, all as hereinafter described, and pointed out in the claims.

Figure 2:
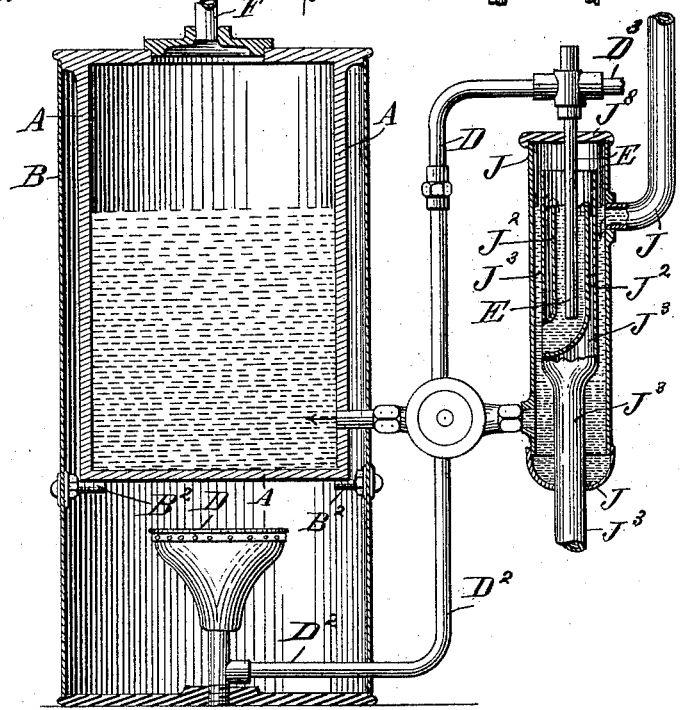
Figure 4:
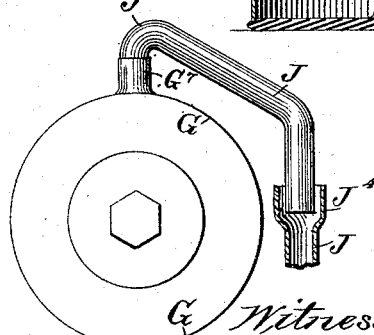
Figure 5:
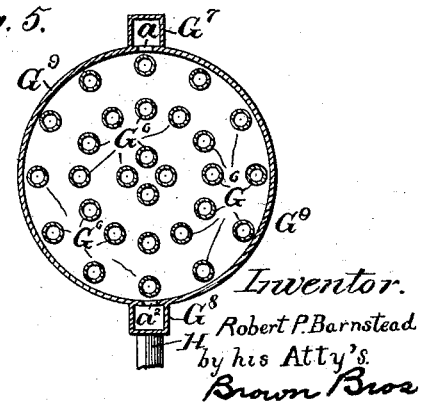

In the drawings forming part of this specification, Figure 1 is a side elevation of a water-distilling apparatus, which is complete in all respects as to this invention. Fig. 2 is a central vertical section of the evaporating-vessel and of the water-passage connecting said vessel with a suitable water-supply under pressure. Fig. 3 is a central vertical and longitudinal section of the drum or condenser of the apparatus. Fig. 4 is a view of one end, and Fig. 5 is a transverse vertical section, line 5 5, Fig. 3, of the drum.

In the drawings, A is the evaporating-vessel, to be in all respects suitable to contain and to evaporate water. As shown, the vessel A is cylindrical. It is vertically placed, and at its lower end it is supported on brackets $B^2$ of a surrounding sheet-metal casing B that is to rest on any suitable bench, table, platform, or other suitable support, or otherwise is to be suitably supported, as well, also, as the evaporating-vessel.

As one means of heating the vessel A to vaporize the water which it contains and which is fed to it, D is a horizontal gas-burner of annular form and located under the vessel A, and $D^2$ is a pipe to supply it with gas, and which is to be connected at $D^3$ with a suitable gas-supply under pressure, and also preferably is to be provided with a device, as at E, and such as described and shown in Letters Patent of the United States, dated February 19, 1889, No. 398,022, to open and close the gas-supply to the burner, but without, however, fully shutting off the gas from the burner, all as in said Letters Patent, and further, so that said device is subject to the heat of the water being evaporated in the vessel A, and as will hereinafter fully appear.

F is a pipe which leads from the upper portion of the evaporating-vessel A and makes communication between it and a cylindrical drum G, the condenser for condensing the vapors arising from the evaporating-vessel and discharging the water of condensation. This drum G is above the evaporating-vessel and it is preferably more or less inclined from end to end, and it is to be supported in any suitable manner.

The drum G is divided by two parallel transverse partitions $G^2$ $G^3$ into three vertical transverse chambers $G^4$ $G^5$ $G^9$, two $G^4$ $G^5$, respectively at each of the opposite ends, and one $G^9$, between said end chambers of the drum. The middle chamber $G^9$ has a series of parallel tubes or passages $G^6$, that extend lengthwise of and are severally closed to it and at their opposite ends are open to the opposite end chambers $G^4$ $G^5$. The pipe F, before referred to and making communication between the evaporating-vessel and the drum G, opens into the lower portion of the higher end chamber $G^4$, and $F^2$ is a pipe which leads from and opens into the lower end chamber $G^5$ at its lower side, and it is for discharging the water of condensation from the drum, and which is condensed therein, as hereinafter appears.

The discharge-pipe $F^2$ of the drum G leads into the mouth of a jug K, the receiver shown for the water of condensation.

$G^7$ $G^8$ are chambers, one $G^7$ at the upper and one $G^8$ at the lower side of the drum G. These chambers $G^7$ $G^8$ are supplemental to and both are in communication with the middle chamber $G^9$ of the drum, each by a separate series of holes or perforations $a$ and $a^2$, leading through the dividing-walls, respectively, of the under and upper chambers $G^7$ $G^8$ and the middle chamber $G^9$ of the drum. The perforations $a^2$ in the lower chamber $G^8$ are of smaller superficial area at and toward the lower end than at and toward the upper end of the drum, and the reverse is true as to the perforations $a$ of upper side chamber $G^7$, and for a purpose as will hereinafter appear.

H is a pipe to lead from a water-supply and one under pressure (not shown) and thence to and opening into the under side chamber $G^8$ at its lower end portion.

J is a pipe opening into and leading from the upper side chamber $G^7$ at its upper end portion and thence downward to and opening into the evaporating-vessel A at its lower end portion. This pipe J has an intermediate vertical portion, which is at one side of and within the height of the evaporating-vessel, and contains two vertical chambers $J^2$ $J^3$, concentrically arranged by preference, and the outer $J^3$ surrounded by the water-way of the pipe.

The vertical chambers $J^2$ $J^3$ are both open at their upper ends to the water-way of the pipe, and one $J^2$, the inner, at its lower end is open to the water-way of the pipe, and the outer $J^3$ at its lower end is extended to the outside of the pipe, to be thence run as may be deemed desirable. Preferably the open upper end of the outer vertical chamber $J^3$ is higher than that of the inner $J^2$, and they are so shown. However, the open upper end of the outer may be on the same level as that of the open upper end of the inner; but for the operation intended and as hereinafter explained it should not be lower.

The device E, before referred to as being located in the gas-pipe $D^2$ for supplying gas to the burner D, extends into the inner vertical chamber $J^2$ of the chambered portion of the pipe J, opening into the evaporating-vessel A, so as thereby to place its contained mercury into position to be subject to the temperature of the water contained in said chambered portion of the pipe J, and which temperature is practically that of the water in the evaporating-vessel, all as will hereinafter fully appear.

$J^4$ is an upward-extending passage which surrounds a portion of the outside of the water-pipe J, leading from the upper side of the drum G. This passage is between the vertical chambered portion of the pipe J and the drum G, and its upper end opens to the air and its lower end to the water-way of the pipe J. The water-pipe J below its upward passage $J^4$ has a branch pipe $J^5$, which is to lead to any suitable point, and this branch pipe $J^5$ and the pipe J below it are each preferably to have a valve $J^6$ $J^7$, respectively, to open and close them, according as may be desired.

The several parallel horizontal dotted lines, Fig. 2, of the evaporating-vessel A and of the water-way and inner vertical chamber $J^2$ of the pipe J represent water and its height or level within the evaporating-vessel A at which it is to be maintained in the operation of the apparatus, as hereinafter explained.

The upper end of the chambered portion of the water-pipe J, leading to the evaporating-vessel A, as shown, is closed by a cap $J^8$, but the cap may be removed.

The apparatus described is suitably connected at its water-supply pipe H and its gas-supply pipe $D^3$, respectively, to a continuous water-supply under pressure and to a continuous gas-supply and with the valve $J^7$ of the water-pipe J opened and the valve $J^6$ of the branch pipe $J^5$ of said water-pipe closed. On then properly adjusting the supply of water and lighting the gas-burner and properly adjusting its supply the water from the supply and under pressure and in a continuous flow first enters the apparatus at the under side chamber $G^8$ and thence passes therethrough into and through first the middle chamber $G^9$ and then into the upper side chamber $G^7$ severally of the drum G, and thence through the pipe J into the evaporating-vessel, and on filling it to the determined height or level (all other parts of the apparatus through which it has passed and the supply-pipe obviously being also filled) all water of supply in excess of said height or level, and which level, as will hereinafter appear, is that of the upper open end of the inner chamber $J^2$ of the chambered portion of the water-pipe J, then flows over said upper open end of the inner chamber $J^2$ and through the outer chamber $J^3$ to the outside of the water-pipe J to waste or otherwise, as may be desired. Thus the apparatus being started and the supply of water obviously checked or regulated to obviate any unnecessary overflow thereof, as has been described, and yet to compensate for the water evaporated in the evaporating-vessel on a then heating of the water in the evaporating-vessel to a degree sufficient to evaporate it, and continuing its evaporation the vapors enter into the end chamber $G^4$, and therefrom pass into the tubes $G^6$ of the middle chamber $G^9$ of the drum, and by the cooling action thereon of said tubes, because of the continuous movement of water from the water-supply about them and through said middle chamber $G^9$, said vapors are condensed and their water of condensation discharged at the pipe $F^2$ and entered into the jug K distilled, while at the same time the water passing through said middle chamber $G^9$ and therein serving to condense the vapors in its tubes, as has been stated, necessarily thereby, more or less heated, passes on into the evaporating-vessel to be therein evaporated and its vapors condensed in the drum, all as before, and so on continuously.

The heating of the water supplied to the evaporating-vessel and before it enters therein, as has been described and as practical use demonstrates, is sufficient to free its ammoniacal and other extraneous and impure gases, which as the water passes on from the drum G escape at the vertical passage $J^4$ of the water-pipe J, and the water thereby being freed of them, obviously on then being evaporated in the evaporating-vessel and the vapors condensed in the drum G and otherwise, all as described, the water of condensation must necessarily be pure, in so far, at least, as the purity of the water in the first instance was impaired by the presence of so much of said gases escaping, as described.

With the cover $J^8$ of the chambered portion of the water-pipe J removed, obviously another opportunity is afforded for the gases to escape from the water. This may be used in connection with the vertical gas-escape $J^4$ of the water-pipe J; but the gas-escape $J^4$ is most preferable to use, as at that point the water is at the better heat for the escape of gases, as described.

The inner and outer chamber $J^2$ $J^3$ of the water-pipe J acting in co-operation prevent, as is obvious, any substantial rise of the level of the water in the evaporating-vessel A above the level of the upper open end of the inner chamber $J^2$, for the reason that on any increase thereabove the water necessarily overflows into the outer chamber $J^3$ and thereby is carried off.

The regulator device E for the gas-burner, and hereinbefore referred to, forms no part of this invention, nor is the invention to be limited to any particular means for heating and thereby evaporating the water in the evaporating-vessel. The gas-burner and regulator device therefor shown, but only as a means for heating the water desired to be evaporated, in many instances would no doubt be most convenient, as also efficient, and as they are shown plainly it is well to observe that the regulator is to be adjusted to maintain a proper supply of gas to the burner for the heat necessary to continuously evaporate the water, and that also it should be placed, as, for illustration, in the inner chamber $J^2$ of the water-passage J, the water of which is practically at the temperature of the water in the evaporating-vessel, to wit, at a boiling-point in ebullition.

The ebullition of the water in the chamber $J^2$ of the water-pipe J, in co-operation with the necessarily more or less back-pressure on the water of the water-pipe J, because of the water evaporation which is occurring within the evaporating-vessel forces the scum and other impurities in the water not vaporized to the surface of the water in chamber $J^2$, and thus their discharge is secured because of the overflow which occurs from time to time from said chamber J² into the chamber J³, as described. In this manner the water to be and before being evaporated is practically relieved of impurities, not only those existing therein in a gaseous but in other conditions.

The branch pipe J⁵, leading from the water-supply pipe J for the evaporating-vessel, enables a portion of the water which has passed through the drum G, and therein served to condense the vapors, as described, to be drawn off, by which, as is plain, sufficient water to insure condensation of the vapors in the drum G, and with the rapidity desired can be used without at the same time unduly forcing the evaporating-vessel or so increasing the overflow at the upper end of the chamber J² as to practically interfere with the ebullition of the water therein and its advantageous result, heretofore stated.

The upper and lower side chambers G⁷ G⁸, in communication by perforations $a$ $a^2$, of an unequal area, as has been explained, with the chamber G⁹ of the condensing-drum G, and all otherwise as described and severally acting in co-operation, secure a most even diffusion of the water from the water-supply within the chamber G⁹ and a confinement of it about its tubes G⁶, and thus the utilization of the water for cooling the tubes and to condense the vapors therein is rendered most effectual, positive, and reliable.

As to the level of the upper open end of the chamber J³ in relation to that of the upper open end of the chamber J², all as has been before stated, if the upper open end of the chamber J³ is lower than that of the chamber J², chamber J² then ceases to serve as a regulator of the level of the water in the evaporating-vessel. It is preferable, however, to have the upper open end of the chamber J³ higher than that of the chamber J², as it secures steadiness to the overflow, as described, and prevents the occurrence of sudden changes of water-level in said chambered portion of the water-pipe, as also in the evaporating-vessel, and insures more steady and even working of the chambers J² J³ in co-operation, as explained, to maintain a uniformity of the level of water in the evaporating-vessel.

The condensing-drum G and its construction and attachments, all as herein described, are most effective in the operation of the apparatus; but obviously other forms of condensers could be used, and also means other than the water to be evaporated could be used to secure the condensation desired without departing from the essence of this invention. Again, evaporating-vessels of other forms and constructions to secure a heating of the water within them to evaporate it may be used, and the invention is not to be limited in these relations; nor, broadly considered, is the invention to be limited to the means described and shown for heating the water which is to be evaporated before it enters into the evaporating-vessel.

The inclination of the condenser-drum G, as described, facilitates the flow of the water of condensation from its condensing-tubes; but the drum may be horizontal and its tubes inclined. However, the arrangement and construction shown and described are most preferable.

The condensing or cooling drum G, constructed of the several parts combined together, as explained, and the supply-pipe J and discharge-opening, in combination with vertical chambers J² J³, constitute only in the combinations stated parts of this invention; but each of itself is the subject-matter of a separate application, Serial Nos. 373,367 and 373,366, respectively, for Letters Patent of the United States.

Having thus described my invention, what I claim, and desire to secure by Letters Patent, is—

1. In an apparatus for distilling water, the combination, with an evaporating-vessel, means to heat said vessel, and a condenser having its steam-space in communication with the steam-space of evaporating-vessel and adapted for the discharge of the water of condensation, of a pipe connecting water-space of evaporating-vessel with a water-supply under pressure, and between its communications with said vessel and said supply and outside of said vessel having an opening leading laterally from and in a direction opposite to that of the run of water through and directly open at the outside of it, and of means to heat the water as it passes through and before it reaches said opening of said pipe, substantially as described, for the purposes specified.

2. In an apparatus for distilling water, the combination, with an evaporating-vessel, means to heat said vessel, and a condenser having its steam-space in communication with the steam-space of evaporating-vessel and adapted for the discharge of the water of condensation, of a pipe leading from a water-supply under pressure and in communication with the water-space of said condenser, and a pipe leading from and in communication with the water-space of said condenser and of said evaporating-vessel, and having an opening leading laterally from and in a direction opposite to that of the run of water through and directly open at the outside of it and located between its communications with the water-spaces of said condenser and said evaporating-vessel, substantially as described, for the purposes specified.

3. In an apparatus for distilling water, the combination, with an evaporating-vessel, means to heat said vessel, and a condenser having its steam-space in communication with the steam-space of evaporating-vessel and adapted for the discharge of the water of condensation, of a pipe connecting water-space of evaporating-vessel with a water-supply under pressure, and two separated vertical chambers J² J³, located within, and the chamber J³ surrounded by, a vertical portion of the water-way of said pipe and placed outside or about chamber J², and both chambers open at both their upper and their lower ends, at their upper ends the inner at a height and the outer at or above a height corresponding to that of the communication of said pipe with the upper end of the said vertical portion of its water-way, and at their lower ends the inner open to said vertical portion of said water-way below said level of its upper open end and the outer to the outside of said vertical portion of said water-way, substantially as described, and for the purposes specified.

4. In a water-distilling apparatus, the combination, with an evaporating-vessel and means to heat said vessel, of a condenser constructed with three transverse chambers severally separated from each other and having the opposite end chambers in communication with each other by a passage or passages leading through but closed to the intermediate chamber, and one end chamber in communication with the steam-space of the evaporating-vessel and the other end chamber adapted for the discharge of the water of condensation, and also with chambers at opposite sides and lengthwise of and each in communication with the intermediate chamber of said condenser by means of perforations of greater superficial area at one than at the other end of each of said side chambers, but the reverse as to the ends of both, and water-pipes, one in communication with a water-supply under pressure and one of said side chambers of said condenser and at its end having the perforations of smaller superficial area, and another in communication with the other of said side chambers of said condenser and at its end having the perforations of smaller superficial area, and with the evaporating-vessel, substantially as described, for the purposes specified.

5. In a water-distilling apparatus, the combination, with an evaporating-vessel, means to heat said vessel, and a condenser having its steam-space in communication with the steam-space of the evaporating-vessel and adapted for the discharge of the water of condensation, of a pipe leading from a water-supply under pressure and in communication with the water-space of said condenser, and a pipe leading from and in communication with the water-space of said condenser and of said evaporating-vessel and having an opening leading laterally from and in a direction opposite to that of the run of water through and directly open at the outside of it and located between its communications with the water-spaces of said condenser and said evaporating-vessel, and two separated vertical chambers J² J³, located within, and the chamber J³ surrounded by, a vertical portion of the water-way of said pipe in communication with the water-space of said evaporating-vessel and between said vessel and said opening of said pipe and placed outside or about chamber J², and both chambers open at both their upper and their lower ends, at their upper ends the inner at a height and the outer at or above a height corresponding to that of the communication of said pipe with the upper end of the said vertical portion of its water-way, and at their lower ends the inner to said vertical portion of said water-way below said level of its upper open end and the outer to the outside of said vertical portion of said water-way, substantially as described, and for the purposes specified.

In testimony whereof I have hereunto set my hand in the presence of two subscribing witnesses.

ROBERT P. BARNSTEAD.

Witnesses:
ALBERT W. BROWN,
HENRY F. McKEEVER.